United States Patent
Chiu et al.

(10) Patent No.: US 6,587,921 B2
(45) Date of Patent: Jul. 1, 2003

(54) METHOD AND APPARATUS FOR CACHE SYNCHRONIZATION IN A CLUSTERED ENVIRONMENT

(75) Inventors: Lawrence Yium-chee Chiu, Cupertino, CA (US); Carlos Francisco Fuente, Southsea (GB); Joseph Samuel Glider, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 108 days.

(21) Appl. No.: 09/851,468

(22) Filed: May 7, 2001

(65) Prior Publication Data

US 2002/0194429 A1 Dec. 19, 2002

(51) Int. Cl.$^7$ .............................................. G06F 12/00
(52) U.S. Cl. ..................... 711/119; 711/141; 711/147; 711/152; 707/8; 707/201
(58) Field of Search ................. 711/119, 121, 711/141, 147, 152; 707/8, 201

(56) References Cited

U.S. PATENT DOCUMENTS

| | | | | |
|---|---|---|---|---|
| 6,094,654 | A | * | 7/2000 | Van Huben et al. ............ 707/8 |
| 6,112,281 | A | * | 8/2000 | Bamford et al. ............ 711/141 |
| 6,314,501 | B1 | * | 11/2001 | Gulick et al. ............... 711/153 |
| 6,360,231 | B1 | * | 3/2002 | Pong et al. ................. 707/201 |
| 6,374,332 | B1 | * | 4/2002 | Mackenthun et al. ....... 711/145 |
| 6,385,625 | B1 | * | 5/2002 | Slaughter .................... 707/201 |

OTHER PUBLICATIONS

E. Omiecniski et al., "Performance Analysis of a Concurrent File Reorganization Algorithm for Record Clustering," 1994, IEEE Transactions on Knowledge and Data Engineering, 6(2):248–257.

E. Omiecinski et al., "Concurrent File Reorganization for Record Clustering A Perfromance Study," 1992, IEEE, pp. 265–272.

F.E. Bassow, IBM AIX Parallel I/O System: Installation, Administration, and Use. IBM, Kingstom, May 1995. Documnet No. SH34–6065–00.

R. Bennett et al., "Jovian: A Framework for Optimizing Parallel I/O," 1994, In Proc. of the Scalable Parallel Libraries Conf., IEEE Computer Society Press, pp. 10–20.

P.F. Corbett et al., "The Vesta Parallel File System," 1996, ACM Transactions on Computer Systems, 14(3):225–264.

J. Huber et al., "PPFS: A High Performance Portable Parallel File System," 1995, In Proc. of the 9$^{th}$ ACM Int'l Conf. on Supercomputing, ACM Press, pp. 385–394.

(List continued on next page.)

Primary Examiner—Hiep T. Nguyen
Assistant Examiner—Ngoc Dinh
(74) Attorney, Agent, or Firm—Gates & Cooper LLP

(57) ABSTRACT

Providing high availability cache coherency in a distributed cache environment for a storage cluster. An extent owner node in a cluster controls extent disk requests and the locking and demotion of extent data. An extent client node may access the data but does not control destaging or locking. The extent client waits for a lock state grant prior to completing any I/O request. An extent client is allowed to receive data from a host for a write request and later let the extent owner sort out the proper cache coherency order. An extent client is not required to request a lock state change from the extent owner when a read cache hit occurs in the extent client. When a read miss occurs in an extent client, the extent client can initiate a stage request from disk and request the owner for a lock state change at a later time.

36 Claims, 4 Drawing Sheets

OTHER PUBLICATIONS

D. Kotz et al., "Caching and Writeback Policies in Parallel File Systems," 1991, IEEE Symp. on Parallel Distributed Processing, pp. 60–67.

S. Moyer et al., "PIOUS: A Scalable Parallel I/O System for Distributed Computing Environments," 1994, In Proc. of the Scalble High–Performance Computing Conference, pp. 71–78.

W. Ng et al., "The systematic improvement of fault tolerance in the Rio file cache," 1999, In Proc. of 1999 Symposium of Fault–Tolerant Computing, 1999, pp. 76–83.

N. Nieuwejaar et al., "The Galley parallel file system," 1997, Parallel Computing, 23(4):447–476.

B. Nitzberg, "Performance of the iPSC/860 Concurrent File System," 1992, Technical Report RND–92–020, NAS Systems Division, NASA Assoc Research Center.

N. Peyrouze et al., "An efficient fault–tolerant NFS server designed for off–the –shelf workstations," 1996, IEEE Proceeding of 1996 Symp on Fault–Tolerant Computing, pp. 64–73.

P. Pierce, "A Concurrent File System for a Highly Parallel Mass Storage Subsystem," 1989, In Proc. of the Fourth Conf. on Hypercube Concurrent Computers and Applications, pp. 155–160.

A. Purakayastha et al., "ENWRICH: A compute–processor write caching scheme for parallel file systems," 1996, ACM Press In Proc. of the Fourth Workshop on Input/Output in Parallel and Distributed Systems, pp. 55–68.

K.E. Seamons et al., "Server–Directed Collective I/O in Panda," 1995, In Proc. of Supercomputing, IEEE, pp. 1–14.

R. Thakur et al., "Passion: Optimized I/O for Parallel Applications," 1996, IEEE Computer, 29(6):70–78.

* cited by examiner

METHOD AND APPARATUS FOR CACHE SYNCHRONIZATION IN A CLUSTERED ENVIRONMENT

CROSS-REFERENCE TO RELATED APPLICATIONS

This application is related to the following co-pending and commonly assigned patent applications, which applications are incorporated by reference herein:

U.S. patent application Ser. No. 09/755,858, "METHOD AND APPARATUS FOR SUPPORTING PARITY PROTECTED RAID IN A CLUSTERED ENVIRONMENT", by Lawrence Yium-chee Chiu et. al., filed on Jan. 5, 2001;

U.S. patent application Ser. No. 09/851,452, filed on the same date herewith, entitled "METHOD AND APPARATUS FOR A GLOBAL CACHE DIRECTORY IN A STORAGE CLUSTER", by Lawrence Yium-chee Chiu et. al., and U.S. patent application Ser. No. 09/851,014, filed on the same date herewith, entitled "METHOD AND APPARATUS FOR IMPROVING WRITE PERFORMANCE IN A CLUSTER-BASED FILE SYSTEM", by Ying Chen et. al.

BACKGROUND OF THE INVENTION

1. Field of the Invention

The present invention relates to data storage systems, and in particular, to a method and apparatus for utilizing a number of cache storage nodes in a cluster storage subsystem.

2. Description of the Related Art

The ability to manage massive amounts of information in large scale databases has become of increasing importance in recent years. Increasingly, data analysts are faced with ever larger data sets, some of which measure in gigabytes or even terabytes. To access the large amount of data, two or more systems that work together may be clustered. Clustering generally refers to multiple computer systems or nodes (that comprise a central processing unit (CPU), memory, and adapter) that are linked together in order to handle variable workloads or to provide continued operation in the event one computer system or node fails. Clustering also provides a way to improve throughput performance through proper load balancing techniques. Each node in a cluster may be a multiprocessor system itself. For example, a cluster of four nodes, each with four CPUs, would provide a total of 16 CPUs processing simultaneously. Practical applications of clustering include unsupervised classification and taxonomy generation, nearest neighbor searching, scientific discovery, vector quantization, time series analysis, multidimensional visualization, and text analysis and navigation. Further, many practical applications are write-intensive with a high amount of transaction processing. Such applications include fraud determination in credit card processing or investment house account updating.

In a clustered environment, the data may be distributed across multiple nodes that communicate with each other. Each node maintains a data storage device, processor, etc. to manage and access a portion of the data that may or may not be shared. When a device is shared, all the nodes can access the shared device. However, such a distributed system requires a mechanism for managing the data across the system and communicating between the nodes.

In order to increase data delivery and access for the nodes, cache may be utilized. Cache provides a mechanism to store frequently used data in a location that is more quickly accessed. Cache speeds up data transfer and may be either temporary or permanent. Memory and disk caches are utilized in most computers to speed up instruction execution and data retrieval. These temporary caches serve as staging areas, and their contents can be changed in seconds or milliseconds.

In the prior art, a mainframe or centralized storage model provides for a single global cache for a storage cluster. Such a model provides a single pipeline into a disk drive. Having data in one central location is easier to manage. However, to share data stored in a centralized location, multiple copies of the data must be made.

In another prior art model, the disk is separated from its controller and a storage area network (SAN) is utilized to store the global cache. In a SAN, a back-end network connects multiple storage devices via peripheral channels such as SCSI (small computer system interface), SSA (serial storage architecture), ESCON (enterprise systems connection), and Fibre Channel. A centralized SAN ties multiple nodes into a single storage system that is a RAID (redundant array of independent devices) device with large amounts of cache and redundant power supplies. A centralized storage topology, wherein data is stored in one central location, is commonly employed to tie a server cluster together for failover and to provide better overall throughput. In addition, some storage systems can copy data for testing, routine backup, and transfer between databases without burdening the hosts they serve.

In a decentralized SAN, multiple hosts are connected to multiple storage systems to create a distributed system.

In both decentralized and centralized SAN systems, nodes can be added, and data can be scaled and managed better because the data does not have to be replicated.

Typically, in the prior art, there are two nodes in SAN storage products. Such storage products are referred to as "active-passive"—one node in the storage product is active and one is passive. When utilizing a passive node, there is no input/output (I/O) operations between the nodes unless requested (i.e., the node is passive). Such a request is primarily invoked when there is an error on the node the user is currently communicating with and recovery is required. Further, I/O can only occur in one direction—up/down the active channel. Such one way communication results in the inability to share information. Thus, with an active-passive storage product, the lack of active bi-directional communication between the nodes slows performance.

Storage subsystems, such as a storage cluster, are widely used to serve "shared" data in an enterprise computing environment that has high performance, fault tolerance, and storage capacity requirements. As described above, in a prior art clustered environment, one or more nodes are used to access data. However, the prior art systems do not provide high availability for cache coherency in a distributed cache environment. Accordingly, what is needed is a storage system and synchronization sequence method for providing high availability cache coherency in a distributed cache environment for a storage cluster. Further, what is needed is a storage system that provides fault tolerance, the minimization of the number of messages exchanged between nodes, the ability to maintain a single modified image of the data (with multiple copies), and the ability to maintain both local and remote locking states.

SUMMARY OF THE INVENTION

To address the requirements described above, the present invention discloses a method, apparatus, article of manufacture, and a memory structure that provides high availability cache coherency in a distributed cache environment for a storage cluster.

A number of hosts communicate with a storage cluster that manages data access to/from an array of disks. The storage cluster includes a number of nodes. Each node in a cluster may either be an owner of an extent (referred to as an extent owner node) or a client for a given extent (referred to as an extent client node), but each node can be the owner of one extent and the client for another extent simultaneously. The extent owner node controls requests to disk for the extent and the locking and demotion of data in the extent. The extent client node may access the data but does not control destaging or locking of the extent.

Generally, an extent client node must wait for the proper lock state granted for the extent from the extent owner node prior to completing any I/O request (i.e., the extent client node must wait for permission from the extent owner node). However, one or more embodiments of the invention provide various exceptions to this general rule that increases performance. An extent client node is allowed to get a "head-start" to receive data from a host for a write request and later let the extent owner node sort out the proper order for cache coherency. In another exception, an extent client node is not required to request a lock state change from the extent owner node when a read cache hit occurs in the extent client node. Further, when a read miss occurs in an extent client node, the extent client node can initiate a stage request from disk and request the owner for a lock state change at a later time (but prior to giving the requested data back to the host). In other words, nodes don't need to obtain permission for reading data prior to starting to pull data up from a disk.

Additionally, the node assigned to be an extent owner can change depending on: (1) access patterns; (2) to improve performance; and/or (3) due to a failure of the owner node, or due to a failure of the owner to communicate to the "shared" devices. Such node assignment can be performed in a predictive manner.

The extent owner notifies the client with an invalidation message when the owner knows the client's data is out of date. The extent owner can also notify the client with a "demote" message because the global cache resource is constrained. Further, the extent owner may only target client's cache data that has not been accessed for a while. In response, the client may be required to immediately "demote" (throw away) its copy of the data upon receiving instruction from the owner. Alternatively, the client may choose to not demote the data at all due to client's prediction on the access pattern to the data. Nodes may be required to tell the owner when they have complied, but these messages don't have to be sent immediately (they can be batched and sent later if the system is busy).

BRIEF DESCRIPTION OF THE DRAWINGS

Referring now to the drawings in which like reference numbers represent corresponding parts throughout.

DETAILED DESCRIPTION OF PREFERRED EMBODIMENT

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

In accordance with one or more embodiments of the information, a synchronization sequence provides high availability cache coherency in a distributed cache environment for a storage cluster. The sequence is based on a "divide and conquer" or "duty partitioning" in a cluster. Each node in a cluster can either be an "extent owner" or an "extent client" for a given extent (a unit of data or a contiguous piece of data on storage). Further, each node can be both "extent owner" for one extent and "extent client" for another extent at the same time.

The sequence provides a general rule wherein each extent client waits for the proper lock state granted for an extent from the owner prior to completing any I/O request. However, various exceptions to the general rule may be utilized. For example, the sequence allows the extent client to get a head-start to receive data from a host for a write request and later lets the owner sort out the proper order for cache coherency. Such a "lazy" approach allows better write latency by eliminating unnecessary dependency between extent client and extent owner.

In another exception to the general rule, the extent client is not required to request a lock state change with the extent owner for a read cache hit in an extent client. Additionally, in a read miss in an extent client, the extent client can initiate a stage request from disk and request a lock state change from the extent owner at a later time.

Hardware Environment

Figure 1:
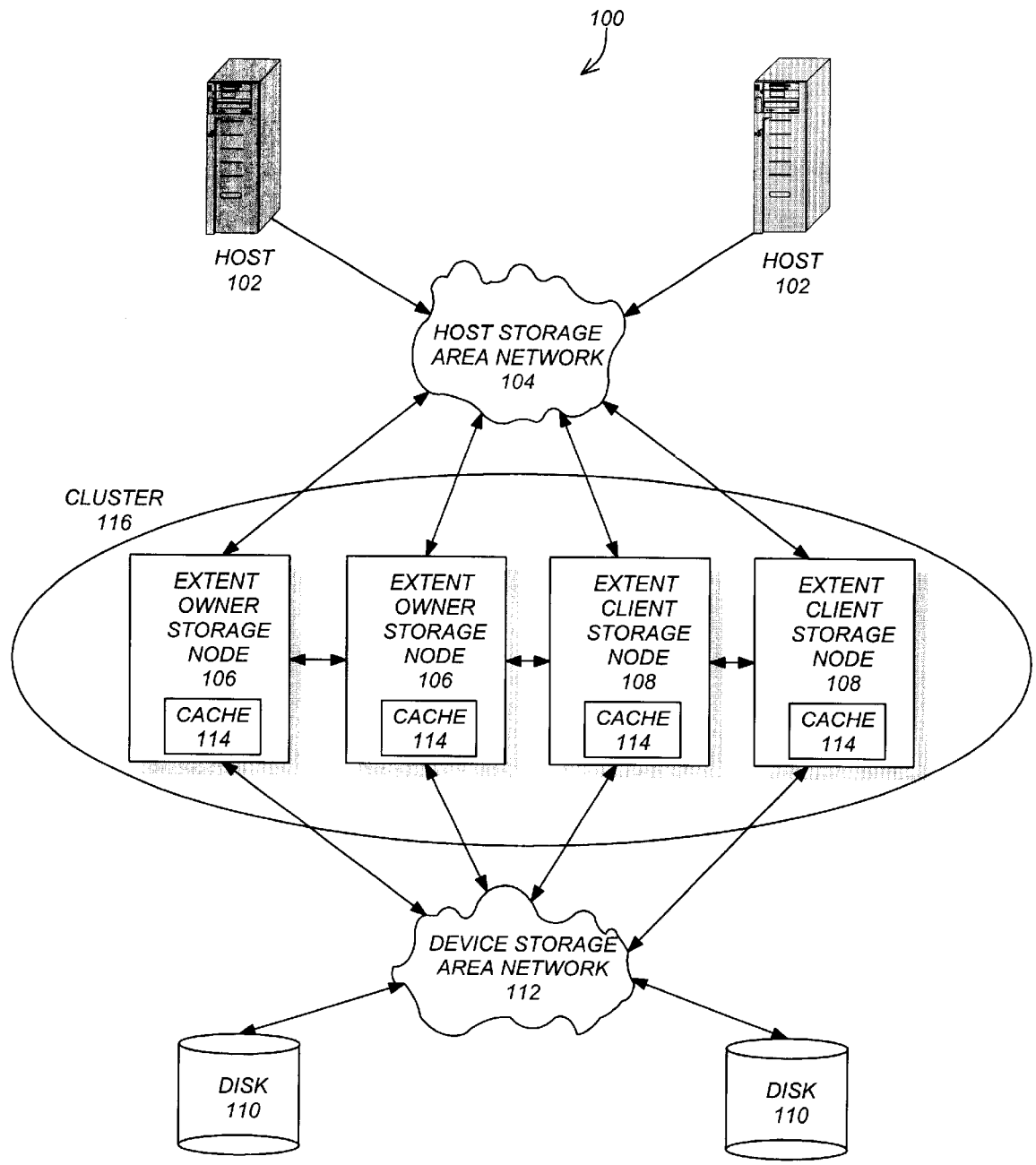
FIG. 1 is a block diagram showing a hardware environment in accordance with one or more embodiments of the invention.

FIG. 1 is a block diagram showing a hardware environment in accordance with one or mote embodiments of the invention. A cluster storage subsystem 100 is comprised of one or more hosts 102 in a host storage area network 104, a number of cache storage nodes 106–108 in a storage cluster 116, and one or mote storage disks 110 in a device storage area network 112. The hosts 102 view the storage cluster 116 as a single logical image of storage. Further, hosts 102 can connect to the cluster 116 through any storage node 106–108.

Each storage node 106–108 is a processing and management unit in a large storage cluster 116. Typically, a storage node 106–108 comprises a processor, a large amount of cache memory 114, a host end interface that enables communication across the host storage area network 104 with hosts 102, a device end interface that enables communication across the device storage area network 112 with disks 110, and an inter-node interface that enables communication with other storage nodes 106–108. The hosts 102, nodes 106–108, and disks 110 can be interconnected to other devices via a local area network, wide area network, internet, or other means of providing communications. Further, all of the storage nodes 106–108 have a direct access path to any disk 110.

In the preferred embodiment, the hosts 102, nodes 106–108, and disks 110 each include one or more processors that execute the logic necessary to accomplish the present invention. This logic may be stored in memory, loaded from a fixed or removable data storage device, or accessible from some other device across the host storage area network 104, the device storage area network 112, or some other communications medium.

Cache Synchronization Sequence

To provide an acceptable level of performance, a storage cluster 116 needs to maintain cache 114 coherency in a distributed cache 114 environment. In addition to maintaining fault tolerance in the event of a single node 106–108 failure, a cluster 116 must maintain only a single modified image (while allowing multiple copies) of the data. One or more embodiments of the invention utilize a synchronization sequence (also referred to as a lazy extent owner (LEO) algorithm) to provide such capabilities. Additionally, the synchronization sequence maintains both local and remote locking states.

To properly synchronize and merge cache 114 data, the synchronization sequence assumes that a single write request from the host 102 for a shared extent is outstanding. If another write request to the same extent is received or is pending prior to the completion of the first request, the final modified image is obtained from a merge operation if the extent is not overlapped or from a discard operation if the extent is overlapped.

The synchronization sequence of the invention is based on a "divide and conquer" or "duty partitioning" concept in a cluster 116. A minimum unit of data management in the storage node 106–108 is referred to as a track. Multiple consecutive tracks compose an extent. Accordingly, each unit of data or each contiguous piece of data on a storage node 106–108 is referred to as an extent. Each node 106–108 in the cluster 116 can be either an "extent owner" storage node 106 or an "extent client" storage node 108 for a given extent. Further, each node 106–108 can be both an extent owner 106 for one extent and an extent client 108 for another extent at the same time.

An extent owner node 106 is a dedicated node 106–108 that is responsible for destaging modified data for a given extent. Destaging is the process of reading data from cache 114 and "pushing" the data to disk 110. Alternatively, destaging is the action of storing an extent in cache memory 114 with active write data to the storage device 110. As a result, destaging causes the extent to change from cached active write data to cached read data. Similarly, staging is the process of reading data from disk 110 and "pulling" the data into cache 114. The extent owner 106 allows both stage and destage operations for the extent for its local cache 114.

Modified data is maintained in two or more nodes 106–108 to support fault tolerance. Such nodes 106–108 are referred to as primary and secondary home nodes 106–108. The primary home is the node 106–108 that receives the write request and maintains a copy of modified data in cache 114. The secondary home is the backup node 106–108 that keeps another copy of modified data. An extent owner node 106 may be used as the secondary home (backup) of modified data and is always one of the two homes for modified extent in cache 114. Accordingly, an extent owner node 106 is any node 106–108 in the cluster 116 that is determined by a selection process to receive and handle any request for a disk 110. The extent owner node 106 is responsible for granting and tracking the lock state of the extent, merging and discarding multiple modified images of the same extent, and the demotion policy of modified data for the given extent in the cluster 116. Further, extent owner node 106 maintains its own demote policy for "unmodified" data or data that is not the second home in its local cache 114.

An extent client node 108 is any node 106–108 in the cluster 116 that is not an owner of the extent and is therefore not responsible for the lock state of the extent. The extent client node 108 can be one of the two homes of a modified extent in cache 114 if the write request is received locally or the extent owner node 106 selects the extent client node 108 as the backup copy of the modified extent. Further, the extent client node 108 is responsible for requesting permission for a given extent from the extent owner node 106, maintaining its own demote policy for "unmodified" data in its local cache 114, and allowing only a stage operation for the extent (and not a destage operation).

The synchronization sequence provides a general rule wherein a client waits for the grant of the proper lock state for an extent from the extent owner node 106 prior to completing any I/O request. However, various exceptions to the general rule ate provided. In one or more embodiments of the invention, one exception is referred to as a "lazy" approach. In a "lazy" approach, an extent client node 108 is allowed to obtain/receive data from a host 102 for a write request prior to waiting for the lock state grant. The extent owner node 106 later sorts out the proper order for cache coherency and merges conflicted write data from competing nodes 106–108. Thus, any node 106–108 does not need to wait for permission for a write operation prior to receiving data from the host 102. Further, any node 106–108 does not need to wait for permission for a read operation prior to initiating a stage operation or inter-node 106–108 transfer. This "lazy" approach allows better write latency by eliminating unnecessary dependency between the extent owner node 106 and the extent client node 108.

In another exception to the general rule, an extent client node 108 is not required to request a lock state change from the extent owner node 106 when a read cache hit occurs in the extent client node 108.

In an additional exception, the extent client node 108 can initiate stage requests from disk 110 and later request or obtain a lock state change from the extent owner node 106 when a read miss occurs in the extent client node 108 (i.e., extent client node 108 can start to pull data up from disk 110 prior to obtaining permission from extent owner node 106). Implementation of such an exception requires efficient I/O cancellation that is supported by a device adapter and the adapter's associated drives to terminate the in-flight I/O operation.

Cache Synchronization Sequence Protocol

Figure 2:
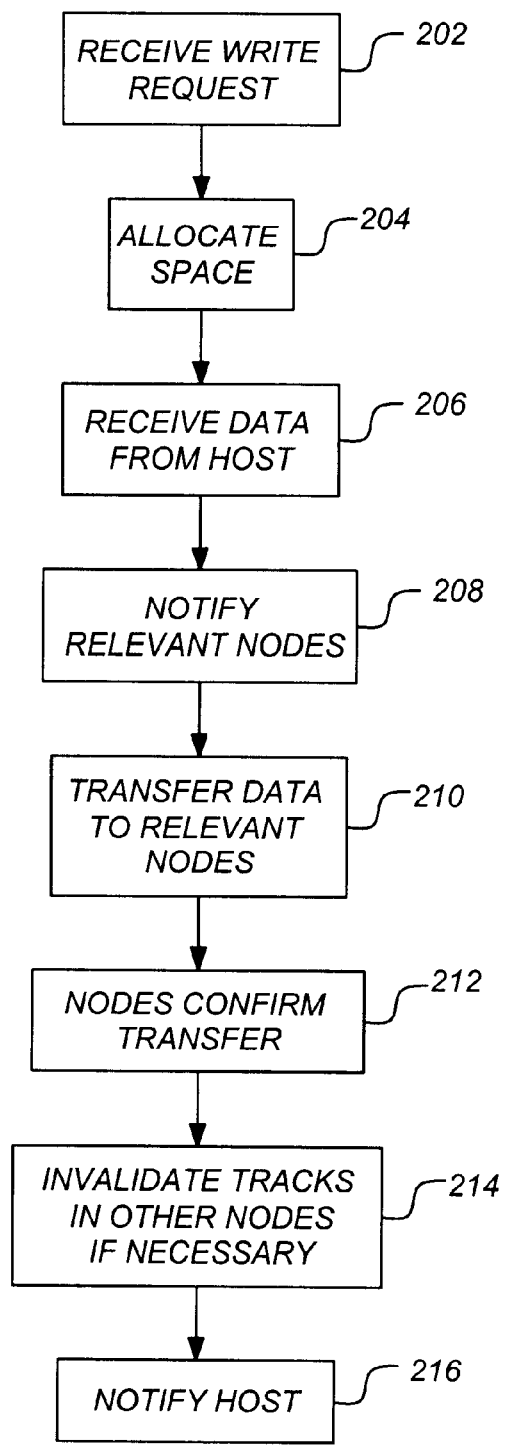
FIG. 2 illustrates the caching protocol for writing to cache in accordance with one or more embodiments of the invention.
Figure 3:
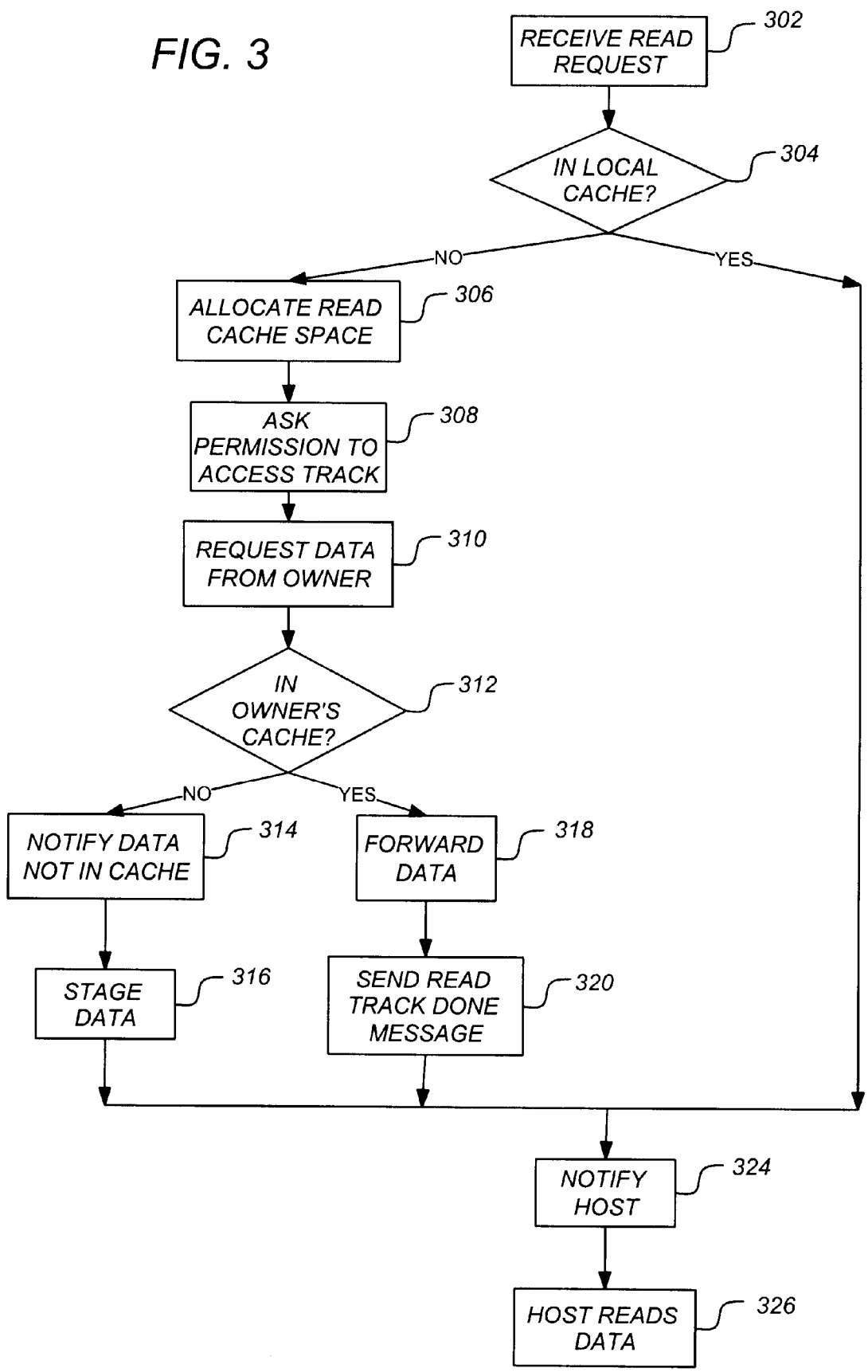
FIG. 3 illustrates the caching protocol for reading data into a host in accordance with one or more embodiments of the invention.

FIGS. 2 and 3 are flow charts illustrating the caching protocol in accordance with the cache 114 synchronization sequence of the invention. FIG. 2 illustrates the caching protocol for writing to cache 114. At step 202, the home node 106–108 (either the extent owner node 106 or extent client node 108) receives a request to write data to an extent's track (a "request to write track" message) from the host 102. At step 204, write cache 114 space is allocated in the home node 106–108. Additionally, the home node 106–108 may assign the relevant track to the allocated cache 114 buffer. Alternatively, if a cache 114 hit occurs (i.e., the data is in the local cache 114 of the home node 106–108), the home node 106–108 merely reuses the previously allocated write cache 114 space. At step 206, the home node 106–108 receives the data from host 102.

At step 208, the relevant nodes 106–108 are informed of the "request to write track" message received from the host 102. For example, if the home node 106–108 is an extent client node 108, after the extent client node 108 receives the data from host 102, extent client node 108 notifies the extent owner node 106 of the request. Similarly, if the home node is the extent owner node 106, after the extent owner node 106 receives the data from host 102, extent owner node 106 notifies the secondary node 106–108 (e.g., a extent client node 108) of the request. The reason to notify the relevant secondary nodes 106–108 of the request is so that all of the data may be synchronized amongst all of the nodes 106–108.

In one or more embodiments, a deadlock situation may arise when both an extent owner node 106 and extent client node 108 receives write requests for the same track at the same time at step 202. In such a situation, both nodes 106–108 may receive the write data in cache 114 at step 206. If both extent owner node 106 and extent client node 108 request the "other" home node 106–108 to become the second home of the write and if they perform their locking in the same order, it will deadlock the system. Thus, to deadlock the system, both extent owner node 106 and extent client node 108 hold local locks at the same time and both extent owner node 106 and extent client node 108 then request the other party to hold the lock to be the second node. To solve this deadlock, one or more embodiments of the invention may provide that the extent owner node 106 can always hold the lock prior to asking the extent client node 108 for the lock. Additionally, the extent client node 108 may only hold its local lock after the extent owner node 106 grants the lock.

At step 210, the data received from host 102 is transferred to the relevant secondary nodes 106–108 notified in step 208. For example, if the home node 106–108 is an extent client node 108, the data is transferred from the extent client node 108 to the secondary node (i.e., the extent owner node 106). Thus, to transfer the data in step 210, secondary node 106–108 receives a request to write a track from the primary node 106–108 at step 202. When the secondary node 106–108 allocates memory space to receive the data at step 204, the secondary node 106–108 can initiate a remote direct memory access DMA) operation to read data from the primary node 106–108 (as part of the transfer at step 210). Alternatively, the primary node 106–108 may know the correct memory address in the secondary node 106–108. In such a case, the primary node 106–108 may use the remote DMA write operation to send the data over to the secondary node 106–108 at step 210. The secondary node 106–108 receives notification when the remote DMA operation is complete and the secondary node 106–108 may then examine the data and the corresponding request.

At step 212, the secondary node 106–108 confirms the completion of the transfer with a "write track done" message to the home node 106–108. For example, after receiving the data, extent owner secondary node 106 may respond to the extent client home node 108 with a "write track done" message. Additionally, the secondary node 106–108 may also provide the home node 106–108 with a list of nodes 106–108 that have the same modified and unmodified track (referred to as remote nodes).

At step 214, the remote nodes 106–108 (nodes that previously contained the same track but did not receive the data from host 102 or another extent 106–108) invalidate the track. Several methods may be used to invalidate a track containing such "other" copies of the data in the cluster. In one or more embodiments, the list of nodes 106–108 that have the same modified and unmodified data can be invalidated by the extent owner node 106. In one or more alternate embodiments, the list of nodes 106–108 that have the same modified and unmodified data can be invalidated by the primary node 106–108. Such invalidation may include sending the remote nodes 106–108 (as notified from the list of nodes 106–108 transmitted with the transfer confirmation of step 212) a message to invalidate the track, the invalidation of the track by the remote nodes 106–108, and the remote nodes 106–108 responding that the invalidation has been completed (e.g., with an "invalidate track done" message).

Thus, if a node 106–108 contains the relevant track but is not the extent owner node 106 or extent client node 108 that received the request to write the data (i.e., is a remote node 106–108), the track on the remote node 106–108 is invalidated (because the data stored in the track is no longer up to date).

At step 216, the relevant node 106–108 notifies the host that the write operation has been completed (e.g., with a "write complete" message).

FIG. 3 illustrates the caching protocol for reading data into host 102. At step 302, the home node 106–108 receives a read request from host 102. At step 304, a determination is made regarding whether or not the data is in the local cache 114 of the home node 106–108. If the data is not in local cache, processing continues at step 306 where read cache space is allocated in the home node 106–108. At step 308, the node 106–108 asks permission from the owner of the track to access the track. To obtain permission, the owner may lock the track locally. In accordance with one or more embodiments of the invention, such a lock state can either be "free", "shared", or "exclusive". Thus, the lock obtained at step 308 may be a "shared" lock in order to enforce a locking policy of write by one—read by many. Such a locking policy protects the data from improper updating and becoming out of synchronization between multiple nodes 106–108.

At step 310, the data is requested from the extent owner node 106. Note that step 310 may not be performed if the data request is received from host 102 directly into extent owner node 106. At step 312, a determination is made regarding whether or not the data is in the extent owner node's 106 cache 114. If the data is not in the extent owner node's 106 cache 114, the extent owner node 106 notifies the home node 106–108 that the data is not in cache at step 314. Such notification may include a "read track done" message that indicates that the extent owner node 106 does not have the latest modified data. At step 316, the home node 106–108 stages the data from disk 110 into the home node 106–108 cache 114. Such staging may be performed prior to obtaining permission from the extent owner node 108.

If the data is in the extent owner node's 106 cache 114, the data is forwarded to the home node 106–108 at step 318. At step 320, the extent owner node 106 notifies the home node 106–108 when the transfer is complete by transmitting a "read track done with data" message to the home node 106–108.

Referring back to the determination at step 304, if the data is in the home node's 106–108 local cache 114, the data may be transferred to host 102 without obtaining prior permission from the extent owner node 106. Further, the data may be transferred to host 102 in parallel with the node 106–108 asking permission from the owner of the track to access the track at step 308. Alternatively, such asking permission and data transfer may be performed serially.

The processing then continues at step 324 wherein the host 102 is notified that the data is ready to be read from the home node 106–108 (e.g., by sending a "read data ready" message to host 102). At step 326, host 102 reads the data from the home node 106–108. The host 102 may not be permitted to read the data until after permission is obtained from the node 106–108 responsible for the data.

Sample Cache Operations

In accordance with the protocols of FIGS. 2 and 3, the following examples illustrate the processing of cache 114 in accordance with one or more embodiments of the invention. In the examples, it is assumed that nodes "A" and "B" are extent client nodes 108 and node "C" is an extent owner node 106.

Extent Client Node 106 Write Miss Operation

In an extent client node 108 write miss operation, the data for an attempted write operation to an extent client node 108 (i.e., node "A") is not located in the cache 114 of the extent client home node 108 (i.e., node "A"), or the secondary nodes 106–108 (i.e., the other extent client node 108—node "B", or the extent owner node 106—node "C").

At step 202, "A" receives a write request. At step 204, "A" allocates write cache 114 space and assigns the track to the allocated buffer. At step 206, "A" receives the data from host 102. Thus, prior to obtaining approval of the proper lock state, "A" begins receiving the data from host 102 (in accordance with the LEO algorithm). At step 208, "A" informs "C" with a "request to write track" message. At step 210, "C" initiates the transfer of data from "A". At step 212, "C" responds to "A" with "write track done". At step 216, "A" responds to the host 102 with a "write complete" message.

Extent Owner Node 108 Write Miss Operation

In an extent owner node 106 write miss operation, the data for an attempted write operation to an extent owner node 106 (i.e., node "C") is not located in the cache 114 of the extent owner home node 106 (i.e., node "C"), or the secondary nodes 106–108 (i.e., the extent client nodes 108—nodes "A" and "B").

At step 202, "C" receives a write request from host 102. At step 204, "C" allocates the write cache 114 space. At step 206, "C" receives the data from host 102. Thus, prior to obtaining approval of the proper lock state, "C" begins receiving the data from host 102 (in accordance with the LEO algorithm). At step 208, "C" informs "A" of the write request with a "request to write track" message. At step 210, "A" initiates the data transfer from "C" to "A". At step 212, "A" responds to "C" with a "write track done" message. The process is complete at step 216 with "C" responding to the host 102 with a "write complete" message.

Extent Client Node 106 Write Local Hit Operation

In an extent client node 108 write local hit operation, the data for an attempted write operation to an extent client node 108 (i.e., node "A") is located locally on the extent client node 108 receiving the write request (i.e., node "A").

At step 202, "A" receives a write request. At step 204, "A" reuses the allocated write cache space. If "A" does not reuse the write cache space and allocates new space instead, then it is identical to the extent client write miss case described above. At step 206, "A" receives the data from host 102. At step 208, "A" informs "C" of the write request with a "request to write track" message". At step 210, "C" initiates the transfer of data from "A". At step 212, "C" confirms the transfer to "A" with a "write track done" message. The process is complete at step 216 with "A" responding to the host 102 with a "write complete message.".

Extent Client Node 106 Write Remote Hit Operation

In an extent client node 108 write remote hit operation, the data for an attempted write operation to an extent client node 108 (i.e., node "A") is not located locally on the extent client node 108 (i.e., node "A") but is located remotely on another extent client node 108 (i.e., node "B"). In such a scenario, it is assumed that node "B" has the same modified or unmodified track and the extent owner node 106 (i.e., node "C") has the same modified track.

At step 202, "A" receives a write request from host 102 and allocates the write cache space at step 204. "A" receives the data from host 102 at step 206 and informs "C" of the request with a "request to write track" message at step 208. At step 210, "C" initiates the data transfer from "A" to "C". At step 212, "C" responds to "A" with a "write track done" message that includes a list of nodes 106–108 with the same modified and unmodified track (i.e., a list that includes node "B"). In parallel, "C" sends an invalidate track message to "B" at step 214. Step 214 also includes "B" invalidating the track and responding to "A" that the invalidation is complete with an "invalidate track done" message. Step 214 may be performed in parallel to a number of nodes 106–108 that have an old copy of data in a track during a write operation. The process is complete at step 216 with "A" responding to host 102 with a "write complete" message.

Extent Client/Owner Node 106 Read Miss Operation

In an extent client/owner node 106–108 read miss operation, the data for an attempted read operation to an extent owner node 106 or an extent client node 108 is not located in the cache 114 of any node 106–108 ("A", "B", or "C").

At step 302, "A" receives a read request from host 102. The read request is for data that is not in the local cache 114 of "A" (step 304). Accordingly, processing continues at step 306 wherein "A" allocates read cache space. At step 308, "A" requests permission from the owner of the track to access the track. If "A" is the owner, no further action may be necessary. Alternatively, the track may be locked locally. At step 310, the data is requested from the extent owner node 106 by "A" transmitting a "read track" message to "C". In a read miss operation, the data is not in the extent owner node's 106 cache 114 (step 312). Accordingly, processing continues at step 314 with "C" responding to "A" with a "read track done" message that includes an indication that the extent owner node 106 "C" does not have the latest modified data. At step 316, the data is staged from disk 110 into the extent client node 108 "A" by "A" reading the data from disk 110. At step 324, the host 102 is notified that the data may be read (i.e., by "A" transmitting a "read data ready" message to host 102). At step 326, host 102 reads the data from "A".

Extent Client/Owner Node 106 Read Local Hit Operation

In an extent client/owner node 106–108 read local hit operation, the data is located in the local cache 114 of the node 106–108 that receives the read request from host 102. Accordingly, the extent client node 108 or extent owner node 106 handles the read request locally.

At step 302, "A" receives a read request. Since the data is in the local cache 114 of "A"(step 304), processing continues at step 324 where "A" responds to the host 102 with a "read data ready" message. At step 326, host 102 reads the data from "A".

Extent Client 106 Read Remote Hit Operation

In an extent client node 108 read remote hit operation, the data for an attempted read operation received by an extent client node 106 is located in the cache 114 of another node 106–108. In the following example, assume that node "A" receives the read request from host 102 and that "C" has the modified track in cache 114.

At step 302, "A" receives a read request. Since the data is not m the local cache 114 of "A" (step 304), "A" allocates read cache space at step 306 and requests/asks for permission to access the track at step 308 (e.g., by requesting and obtaining a local lock on the track). At step 310, "A" requests the data from the extent node owner 106 "C" with a "read track" message. Since the data is in the local cache 114 of "C" (step 312), "C" forwards the data to "A" at step 318. After forwarding the data, "C" responds to "A" with a "read track done with data" message at step 320. At step 324, "A" responds to the host 102 that the data may be read with a "read data ready" message. At step 326, host 102 reads the data from "A".

Global Cache Directory

A simple way to address cache 114 blocks distributed across different nodes 106–108 is through a global cache directory scheme. One or more embodiments of the invention utilize a global cache directory maintained in multiple nodes 106–108 in a storage cluster 116. A historic point of access list is maintained in a symbolic list of each entry in the cache directory. When an I/O operation is requested, the symbolic list is accessed to determine which node's 106–108 cache contains the data. Further, upon the completion of an I/O operation, the symbolic list is updated. The use of a global cache directory is described more fully in co-pending and commonly assigned U.S. patent application Ser. No. 09/851,452, filed on the same date herewith, entitled "METHOD AND APPARATUS FOR A GLOBAL CACHE DIRECTORY IN A STORAGE CLUSTER", by Lawrence Yium-chee Chiu et. al., which application is hereby fully incorporated by reference herein.

Periodically, extent client node 108 can inform the extent owner node 106 with its most recent changes to the cache directory (or of the actual cache directory content) of the extent. Accordingly, the extent owner node 106 should have knowledge of every cache 114 track in the extent client node 108. Further, the extent owner node 106 may expand its global view of cache 114 content of a given extent in the cluster 116 and hence may provide one or more of the following advantages:

1. When an extent client node 108 receives a read request from another client node 108 or host 102, the extent owner node 106 can locate, get, and redirect the remote extent in other nodes 106–108. This can turn a read miss operation into a remote read hit operation. Such an optimization results since reading from disk 110 is slower than reading from cache 114 in the remote node 106–108.

2. For both read and write access of the extent client node 108, the extent owner node 106 can determine if the access is aligned with ownership. Such a determination may cause the extent owner node 106 to relinquish its ownership and let the frequently accessed extent client node 108 become the new owner through a control failover.

3. The extent owner node 106 can accelerate demotion of modified tracks to eliminate "invalidate" messages during write operations if the modified tracks are cached in multiple nodes 106–108.

Destage Policy

As described above, an extent owner node 106 is responsible for destaging any modified data of a given extent. Destaging is the process of reading data from cache 114 and "pushing" the data to disk 110. Alternatively, destaging is the action of storing an extent in cache memory 114 with modified data to the storage device 110. As a result, destaging causes the extent to change from cached modified data to cached read data.

For the extent owner node 106 to destage data, the extent is aligned with the proper size to maximize sequential write performance on disk 110. The extent owner node 106 can take advantage and aggregate all of the destage activities to the disk 110 at the maximal write performance. In accordance with one or more embodiments of the invention, the extent owner node 106 is always the second home of the modified data. Additionally, the extent owner node 106 does not need to communicate with other nodes 106–108 at the beginning of a destage operation.

Figure 4:
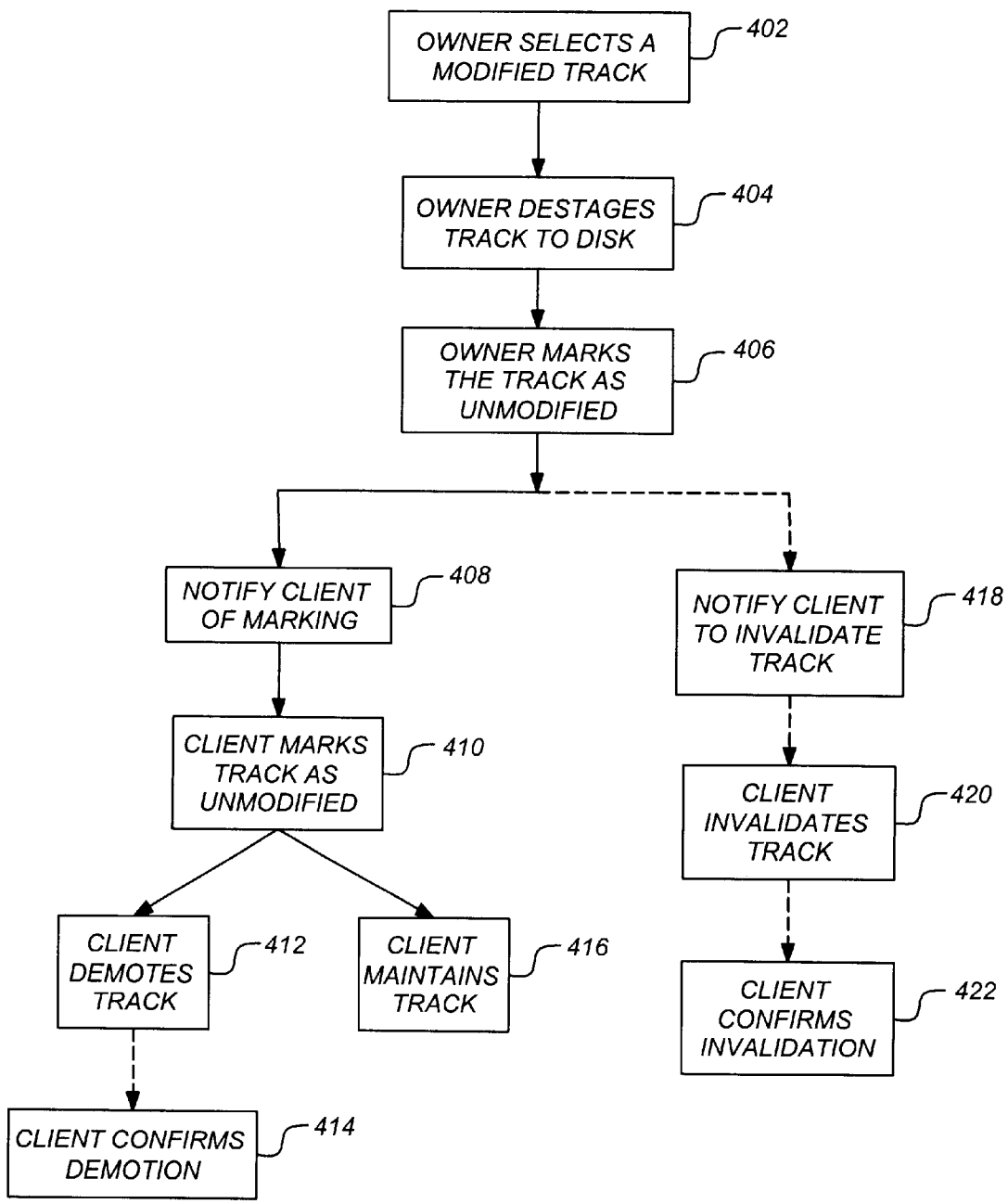
FIG. 4 is a flow chart illustrating the destaging operation in accordance with one or more embodiments of the invention.

FIG. 4 is a flow chart illustrating the destaging operation in accordance with one or more embodiments of the invention. For purposes of example, assume that extent owner node 106 is "C", "A" is one of the two homes of the modified data, and "B" has the same track (which resulted from a read operation). At step 402, the extent owner node 106 "C" selects a modified track to destage. At step 404, extent owner node 106 "C" destages the track to disk 110. At step 406, extent owner node 106 "C" marks the track to unmodified.

The two remaining branches of FIG. 4 (i.e., the branch comprising steps 408–416 and the branch comprising steps 418–422) may be performed in parallel. Alternatively, steps 418–422 may not be performed at all. In such an embodiment, processing continues from step 406 to step 408 without the continued processing of steps 418–422. In the first branch (steps 408–416), the extent owner node 106 "C" opts to notify one or more extent client nodes 108 "A" (that are secondary homes for the data) that a track has been destaged and is unmodified (i.e., step 408) by sending a notification message from "C" to "A". At step 410, the extent client node 108 "A" marks the track as unmodified. Subsequently, the extent client node 108 "A" may opt to demote its copy of the track from its cache 114 at step 412 and notify "C" of the demotion (e.g., by transmitting a "demote track done" message to "C") at step 414. The client "A" may notify the owner "C" when the track is being demoted in a lazy way (e.g., at a later time). Alternatively, extent client node 108 "A" may respond to "C" that "A" maintains a copy of the unmodified data in its cache 114 at step 416. If "A" opts to maintain the data, "C" may maintain this information (i.e., the information that "A" is maintaining the data) as long as "A" has not demoted its copies.

In the second parallel processing branch (steps 418–422) (that may not be performed in one or more embodiments of the invention), extent owner node 106 "C" notifies/informs one or more extent client nodes 108 "B" to invalidate the track (i.e., with an "invalidate track" message) at step 418. At step 420, the extent client node 108 "B" invalidates the track. At step 422, the extent client node 108 "B" confirms the invalidation by transmitting an "invalidate track done" message to "C". As described above, such steps (i.e., steps 418–422) may not be performed in one or more embodiments of the invention during a destaging operation. However, such steps may be performed as part of a write operation in step 214 of FIG. 2 as described above.

Accordingly, the extent owner node 106 is responsible for destaging any data and providing notification of the destaging to extent client nodes 108.

Cache Demotion

The purpose of cache 114 demotion is to "deallocate" cache 114 buffer that will not be accessed in the near future so that the cache 114 buffer may be recycled and filled with new recently accessed data. An extent owner node 106 may signal other nodes 106–108 that their data is old and needs to be updated. Alternatively, extent owner node 106 may signal the other nodes 106–108 to demote a track.

In response, the extent client node 108 can choose to demote the track or to keep the track around. When an extent client node 108 receives a demote request, the extent client node 108 may respond as "best can do". When an extent client node 108 receives an invalidate request, the extent client node 108 may be forced to comply with the request and immediately throw away the corresponding cache 114 data. Accordingly, once the desired action is selected, the notified nodes 106–108 may tell the extent owner node 106 when and/or how they have complied, but such notification may not be immediately necessary (the notifications can be batched and sent at one time).

An extent owner node 106 has the authority to demote both modified and unmodified data from its extent. An extent owner node 106 can demote modified data by destaging the data locally (as described above), or by demoting the data through its unmodified demote operation.

To demote unmodified data, the extent owner node 106 "C" first selects an unmodified track to demote. Thereafter, "C" merely demotes the tracks from the cache directory and the buffer is recycled for further use.

An extent client node 108 can only independently demote its unmodified data for the extent. An extent client node 108 can demote its modified data by initiating a "flush" operation to the extent owner node 106. A "flush" operation causes the modified extent of extent client node 108 to turn into an "unmodified" extent after the extent owner node 106 completes destaging the extent. Alternatively, an extent client node 108 may either demote (if the extent client node 108 is the secondary home for the data) or invalidate modified data based on the receipt of either a "demote" or "invalidate" message respectively. Such a message may be transmitted for a variety of reasons that may include the extent owner node's 106 periodic modified data destage operation. For example, one purpose of a cache 114 demotion is to recycle buffers. One purpose of a cache 114 invalidation is to immediately remove the out of date data, for example.

In one or more embodiments of the invention, an extent client node 108 "A" can demote a track that does not reside in "A" as one of the two (2) homes. Such demoting may include data acquired by "A" from a read miss operation or a remote read hit operation. The following example illustrates an extent client node 108 "A" demoting an unmodified extent in cache 114. In the example, it is assumed that "C" is the centralized data destage node 106 and "C" may or may not have the same unmodified or modified extent in cache 114. First, "A" selects an unmodified extent to demote. "A" then demotes the tracks from the cache directory and the buffer is recycled for future use. Lastly, "A" notifies "C" that an "extent demotion" was initiated (e.g., step 414 of FIG. 4). The "extent demotion" message can be deferred or piggybacked with other messages sent to the extent owner node 106. Further, the "extent demotion" message can eliminate an extra "invalidate" message from the extent owner node 106 when any other node 106–108 receives a new write to the track. The extent client node 108 treats an "invalidate" message from the extent owner nodes 108 as a "NOP" (NO oPeration) when the client has already demoted the track.

Internode Messages

TABLE 1 describes the various messages and operations that may take place between nodes 106–108.

| Type | Operation Used | Description |
|---|---|---|
| Write Track Request & Done | Extent Client/Owner: Write Miss Extent Client/Owner: Write Local Hit Extent Client 108: Write Remote Hit | Write Track Request is used to request another storage node 106–108, to allow the write operation and also to allocate write cache 114 buffer space on behalf of the requester. After the requested node 106–108 allocates the write cache 114 space, it initiates a data transfer from the requester. The "Request" message contains the following: Request identifier, which contains the following fields Requesting node 106– |

TABLE 1-continued describes the various messages and operations that may take place between nodes 106–108.

| Type | Operation Used | Description |
|---|---|---|
| | | 108 identifier Track Identifier Request Type. Track location in the requester's memory. Size of the data transfer A bitmap for modified data of the track. The "Request" message is acknowledged by a "Done" message. The "Done" message contains the following: Request identifier. Request Type. Request Status. Length of data transferred. |
| Read Track Request & Done | Extent Client/Owner: Read Local Miss Extent Client 108: Read Remote Hit | Read Track Request is used to request another node 106–108, name the extent owner 106, to allow the read operation on the track and if the track is cached in the owner 106, the owner 106 forwards the data to the requester. The owner 106 is also required to remember the requester if the operation causes a duplicated remote copy of modified data managed by the owner 106. The "Request" message contains the following: Request Identifier Request Type Track buffer location in the requester's memory. Size of the data transfer The "Request" message is acknowledged with a "DONE" message, which contains: Request identifier Request Type Request Status Length of data transferred. Boolean value to indicate the track is modified. |
| Invalidate Track Request & Done | Extent Client 108: Write Remote Hit | Invalidate Track Request is used to request a node 106–108 to invalidate a given track in cache 114 immediately. This is to eliminate any not consistent copy of a modified track. The "Request" message contains the following: Request Identifier Request Type The "Done" message contains the following: Request Identifier Request Type Request Status |
| Track Destaged | Extent Owner 106: Destage Operation | Track destaged message is to inform extent clients 108 that a modified track has changed to unmodified state. The message contains: Request Identifier Request Type Bitmap of the modified |

TABLE 1-continued describes the various messages and operations that may take place between nodes 106–108.

| Type | Operation Used | Description |
| --- | --- | --- |
| Track Demoted | Extent Client 108: Cache Demotion | data that has been destaged. Track demoted message is to inform the extent owner 106 that a modified track has demoted the track The message contains: Request Identifier Request Type Or the extent owner 106 can inform each client 108 that has a replicated copy of the image that the owner 106 has demoted the track. |

Recovery Operations

One or more embodiments of the invention provide the ability to recover data in the event of a node 106–108 failover.

Failure of an Extent Client Node 108

Failure of an extent client node 108 posts relatively little stress in synchronization of the cluster 116 because the extent owner node 106 has a duplicated copy of all locks and modified data that the extent client node 108 has. Thus, in the event of an extent client node 108 failover, the extent owner node 106 must perform various actions. The extent owner node 106 terminates any active read and write transactions with the failed node 108. Such termination is performed by releasing any buffer held in the name of the failed node 108, releasing any lock held in the name of the failed node 108, and removing any pending operations in the name of the failed node 108.

After terminating the active transactions, the extent owner node 106 refreshes any entry in the cache directory that references the failed node 108. To protect a single home extent node against another failure, a prevention policy may be implemented.

Such a prevention policy may provide for aggressively destaging the single home track if the tracks are sequentially grouped. Such destaging reduces the size of the modified cache 114 for a given track because the effective modified cache 114 in the cluster 116 is smaller after one node 108 fails. Additionally, the policy may provide for replicating the single home track to another client node 106 if the tracks cannot be sequentially grouped for destaging. Such replication minimizes the throughput disturbance from destaging random I/Os. Lastly, the policy may provide for removing any read reference to unmodified data in the failed node 108.

Failure of an Extent Owner Node 106

A failure of an extent owner node 106 is more disruptive to the cluster 116 because all of the remaining nodes 106–108 have to gather information and reconstruct the lock states and destage all of the single home modified data. This disruption can be minimized if extent owner nodes 106 replicate or make mirror images of its state and modified data to a passive node 108. The passive node 108 is only used to potentially minimize the service outage of the cluster 116 during the extent owner node's 106 failover. However, such a scheme requires a relatively large amount of additional resources, such as cache buffer space in the passive mirror node 108 and inter-node 106–108 bandwidth, etc.

While the remaining nodes 106–108 are gathering information, reconstructing lock states, and destaging data, the cluster 116 has to select a node 106–108 or multiple nodes 106–108 to become the new extent owner node 106 and assume the responsibility of the failed extent owner node 106. The node 106–108 selection can be based on the current workload of the node 106–108 or the amount of modified track in the node 106–108. The updated extent owner map broadcasts to all of the members in the cluster 116 that a new extent owner node 106 is being selected. Thereafter, any new writes and reads to the track that does not have an owner node 106 remain pending until an extent owner node 106 is selected.

Once a new extent owner node 106 has been selected, the new owner 106 queries every member in the cluster 116 to reconstruct the lock state of the track. The extent owner node 106 then initiates the transfer of any modified track to the new extent owner node 106. The new extent owner node 106 then destages all of the modified data.

Failback/Concurrent Node Addition

Concurrent node 106–108 addition is required in many high-end scalable storage subsystems to upgrade the performance and storage capacity of the cluster 116 while the subsystem continues to operate with little impact in performance and functionality. The concurrent node 106–108 installation process also provides the same path for a concurrent failback operation.

Because of simplicity, the concurrent node 106 installation process only supports adding one node 106–108 to the cluster at a time. If there are multiple nodes 106–108 that need to be added to the cluster, a selection process determines which node 106–108 will be added to the cluster first. The new node 106–108 or the failback node 106–108 "A" broadcasts its application to the cluster 116 and obtains the extent owner node 106 map from one cluster 116 member 106–108. Thereafter, the new node 106–108 is considered part of the cluster 116. The cluster 116 may then choose to revise the extent owner node 106 map by redistributing and moving extent ownership to the new node 106–108.

CONCLUSION

This concludes the description of one or more embodiments of the invention. In summary, the invention describes a method, apparatus, article of manufacture, and a memory structure for maintaining high availability cache coherency in a distributed cache environment for a storage cluster.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of writing to cache in a clustered environment comprising:

receiving a request to write data in a first node of a storage cluster from a host;

obtaining allocated memory space in a cache of the first node for said data;

receiving the data into the allocated memory space from the host prior to the first node receiving permission for a write operation from the host or a secondary node responsible for a lock state of the memory space in cache, wherein the secondary node later sorts out proper order for cache coherency;

notifying the secondary node in the storage duster of she request to write data; and transferring the data from the first node to the secondary node.

2. The method of claim 1 further comprising invalidating a track in memory of a remote node.

3. The method of claim 1 further comprising notifying the host of a completion of a write operation.

4. The method of claim 1 wherein:

the secondary node is an extent owner node responsible for maintaining a lock stare of an extent in cache; and the first node is an extent client node that maintains a backup copy of the data in an extent in cache.

5. The method of claim 1 further comprising:

destaging the data from the cache of the first node to disk;

marking a track in the cache containing the data as unmodified; and notifying the secondary node of the destaging.

6. The method of claim 5 further comprising:

marking a corresponding tack in the cache of the secondary node as unmodified; and demoting the corresponding track in the cache of the secondary node.

7. The method of claim 1 further comprising synchronizing cache after the data has been received in the first node from the host.

8. A method of reading data from cache in a clustered environment comprising:

receiving a request to read data in a first node of a storage duster from a host;

allocating a track in cache of the first node for the requested data;

obtaining the data into the cache prior to requesting or obtaining a lock state change from a second node responsible for the data;

providing the host with access to the data.

9. The method of claim 8 wherein the obtaining further comprises:

requesting the data from an extent owner node responsible for the data;

receiving notification in the first node from the extent owner node that the data is not in cache; and staging the data from disk into the track in cache prior to requesting a lock state change from the extent owner node.

10. The method of claim 8 further comprising:

requesting the data from an extent owner node responsible for the data; and receiving the data from the extent owner node.

11. The method of claim 8 wherein the data is located in the cache of the first node, the method further comprising forwarding the data to a second node prior to requesting or obtaining a lock state change from a node responsible for the data.

12. The method of claim 8 wherein the asking and obtaining steps are performed in parallel.

13. An apparatus for writing cache in a clustered environment comprising:

(a) a cache;

(b) a first storage node and a second storage node organized in a storage cluster, each storage node having an interface for connecting to a host and a storage disk, wherein each storage node maintains cache, and wherein the first storage node is configured to:

(i) receive a request to write data front a host;

(ii) obtain allocated memory space in the cache of the first storage node;

(iii) receive the data into the allocated memory space from the host prior to the first storage node receiving permission for a write operation from the host or the second storage node that is responsible for a lock state of the memory space in cache, wherein the secondary node later sorts out proper order for cache coherency;

(iv) notify the second storage nodes of the request to write data; and (v) transfer the data from the first storage node to the second storage node.

14. The apparatus of claim 13 wherein at least one of the storage nodes is further configured to invalidate a track in a memory of a remote node.

15. The apparatus of claim 13 wherein at least one of the storage nodes is further configured to notify the host of a completion of a write operation.

16. The apparatus of claim 13 wherein:

the second node is an extent owner node that is configured to be responsible for maintaining a lock state of an extent in cache; and the first node is an extent client node that is configured to maintain a backup copy of the data in an extent in cache.

17. The apparatus of claim 13, wherein at least one of the storage nodes is further configured to:

destage the data from the cache of the storage node to disk;

mark a track in the cache containing the data as unmodified; and notifying the other storage node of the destaging.

18. The apparatus of claim 17 wherein at least one of the storage nodes is further configured to:

mark a corresponding track in the cache of the other storage node as unmodified; and demote the corresponding track in the cache of the other storage node.

19. The apparatus of claim 13, wherein at least one of the storage nodes is further configured to synchronize the cache after the data has been received from the host in one of the storage nodes.

20. An apparatus for reading cache in a clustered environment comprising:

(a) a cache;

(b) a first storage node and a second storage node organized in a storage cluster, each storage node having an interface for connecting to a host and a storage disk, wherein each storage node maintains cache, and wherein at least one of the storage nodes is configured to:

(i) receive a request to read data from a host;

(ii) obtain allocated memory space in the cache;

(iii) obtain the data into the cache prior to requesting or obtaining a lock state change from a node responsible Lot the data; and (iv) provide the host with access to the data.

21. The apparatus of claim 20, wherein at least one of the storage nodes is configured to obtain the data into the cache by:

requesting the data front an extent owner node responsible for the data;

receiving notification from the extent owner node that the data is not in cache; and staging the data from disk into the track in cache.

22. The apparatus of claim 20 wherein at least one of the storage nodes is configured to obtain the data by:

requesting the data from an extent owner node responsible for the data; and receiving the data from the extent owner node.

23. The apparatus of claim 20 wherein the data is located in the cache of the first node, the first storage node further configured to forward the data to the second node prior to requesting or obtaining a lock state change from the node responsible for the data.

24. The apparatus of claim 20 wherein the storage node is configured to ask permission and obtain the data in parallel.

25. An article of manufacture, embodying logic to perform a method of writing cache in a clustered environment, the method comprising:

receiving a request to write data in a first node of a storage cluster from a host;

obtaining allocated memory space in cache of the first node for said data;

receiving the data into the allocated memory space from the host prior to the first node receiving permission for a write operation from the host or a second node responsible for a lock state of the memory space in cache, wherein the secondary node later sorts out proper order for cache coherency;

notifying the second node in the storage cluster of the request to write data; and transferring the data from the first node to the second node.

26. The article of manufacture of claim 25, the method further comprising invalidating a track in a memory of a remote node.

27. The article of manufacture of claim 25, the method further comprising notifying the host of a completion of a write operation.

28. The article of manufacture of claim 25 wherein:

the second node is an extent owner node responsible for maintaining a lock state of an extent in cache; and the first node is an extent client node that maintains a backup copy of the data in an extent in cache.

29. The article of manufacture of claim 25, the method further comprising:

destaging the data from the cache of the first node to disk;

marking a track in the cache containing the data as unmodified; and notifying the second node of the destaging.

30. The article of manufacture of claim 29, the method further comprising:

marking a corresponding track in the cache of the second node as unmodified; and demoting the corresponding track in the cache of the second node.

31. The article of manufacture of claim 25, the method further comprising synchronizing cache after the data has been received in the Brat node from the host.

32. An article of manufacture, embodying logic to perform a method of reading cache in a clustered environment, the method comprising:

receiving a request to read data in a first node of a storage cluster from a host;

allocating a track in cache of the first node for the requested data;

obtaining the data into the cache prior to requesting or obtaining a lock state change from an owner of the data; and providing the host with access to the data.

33. The article of manufacture of claim 32, wherein the obtaining comprises:

requesting the data from an extent owner node responsible for the data;

receiving notification in die first node from the extent owner node that the data is not in cache; and staging the data from disk into the crack in cache.

34. The article of manufacture of claim 32, wherein the obtaining comprises:

requesting the data from an extent owner node responsible for the data; and receiving the data from the extent owner node.

35. The article of manufacture of claim 32 wherein the data is located in the cache of the first node, the method further comprising forwarding the data to a second node prior to requesting or obtaining a lock stare change from the node responsible for the data.

36. The article of manufacture of claim 32 wherein the method asks permissions and obtains the data in parallel.

* * * * *